United States Patent [19]

Pilland, deceased et al.

[11] Patent Number: 4,992,948
[45] Date of Patent: Feb. 12, 1991

[54] PROCESS FOR THE CONTROL OF A MACHINE TOOL

[75] Inventors: Ulrich Pilland, deceased, late of Hochdorf; by Gerhard Ascherl, heir, Weiden; by Robert Ascherl, heir, Herbrechtingen; Franz Ray, Reichenback/Fils, all of Fed. Rep. of Germany; Ake Hofvenstam, Jerbu, Sweden

[73] Assignee: AB Sandvik Coromant, Sandviken, Sweden

[21] Appl. No.: 257,203

[22] Filed: Oct. 13, 1988

[30] Foreign Application Priority Data

Oct. 14, 1987 [EP] European Pat. Off. ............ 87115015

[51] Int. Cl.$^5$ ..................... G06F 15/46; G05B 13/00
[52] U.S. Cl. ......................... 364/474.15; 364/474.22; 364/474.21
[58] Field of Search ............... 364/180, 181, 182, 188, 364/191, 192, 474.01, 474.02, 474.11, 474.13, 474.14, 474.15, 474.21, 474.22, 474.23, 474.24, 474.25

[56] References Cited

U.S. PATENT DOCUMENTS

| | | | |
|---|---|---|---|
| 4,078,195 | 3/1978 | Mathias et al. | 364/474.15 |
| 4,513,381 | 4/1985 | Houser, Jr. et al. | 364/474.15 |
| 4,521,860 | 6/1985 | Kanematsu et al. | 364/474.21 |
| 4,547,847 | 10/1985 | Olig et al. | 364/474.15 |
| 4,584,649 | 4/1986 | Komanduri et al. | 364/474.15 |
| 4,739,488 | 4/1988 | Asakura | 364/474.25 |
| 4,750,105 | 6/1988 | Ohkawa et al. | 364/474.15 |
| 4,823,253 | 4/1989 | Shima et al. | 364/188 |
| 4,896,273 | 1/1990 | Moore et al. | 364/474.02 |

FOREIGN PATENT DOCUMENTS 44192 7/1980 European Pat. Off. .

OTHER PUBLICATIONS

Lange, K., et al, "Neue Wege fur Konstruktion and Fertigung von Umformwerkzeugen durch CAD/-CAM", Band 76, Nr. 2, Springer-Verlag Stuttgart, Germany, pp. 79–84 (1986).
Koloc, J., "Machining Technology in Computer Aided Programming", NCS, Inc., Glenview, Ill., pp. 133–147 (1977).

Primary Examiner—Jerry Smith
Assistant Examiner—Jim Trammell
Attorney, Agent, or Firm—Burns, Doane, Swecker & Mathis

[57] ABSTRACT

A machine tool is controlled by means of a data processing unit in a manner such that the optimum machining data may be determined by an operator having neither special programming skills nor specific knowledge concerning the variables affecting the machining data. All technical variables related to the given machine tool, the workpiece, different processing methods and boundary conditions are stored in a data base and taken into account. The operator is provided with a ranking of possible cutting edge geometry/bit material pairings, from which the most favorable pairing may be selected.

16 Claims, 2 Drawing Sheets

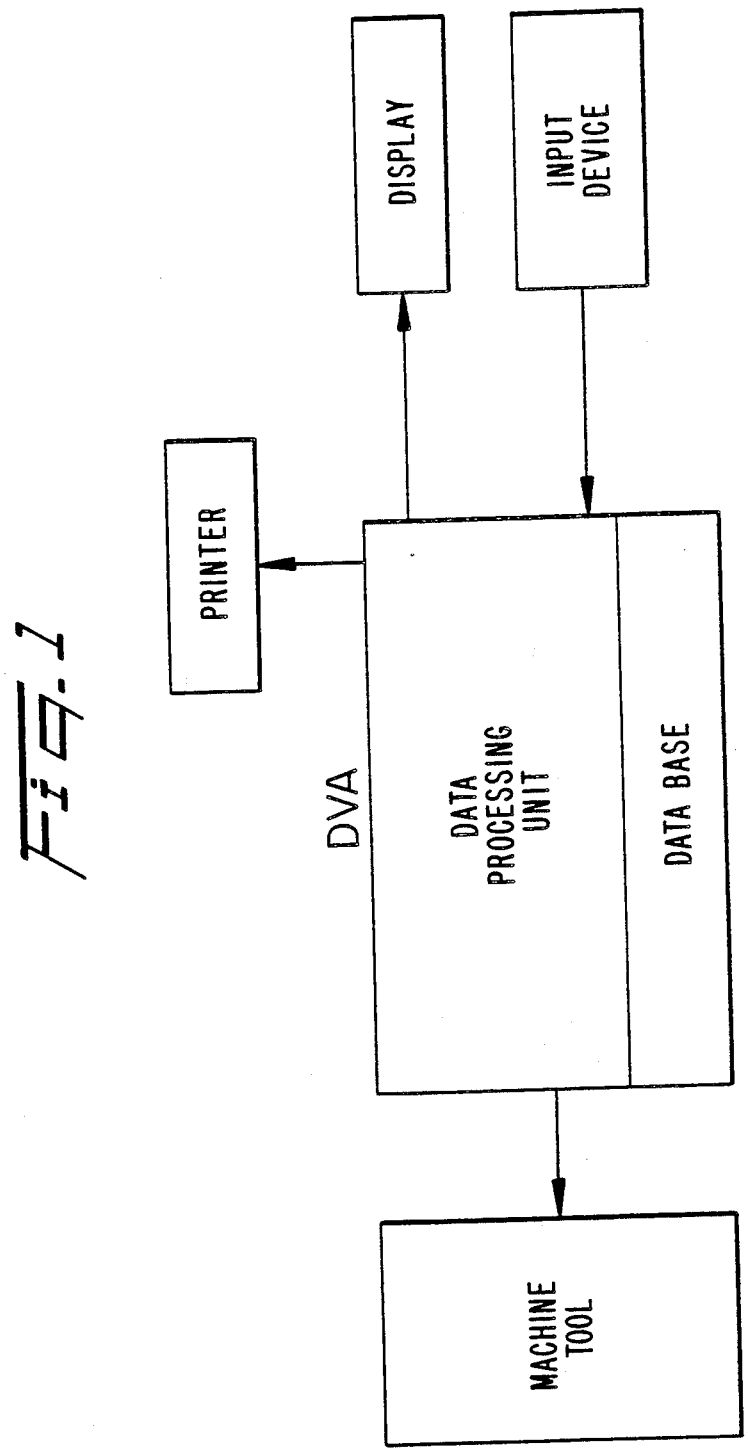

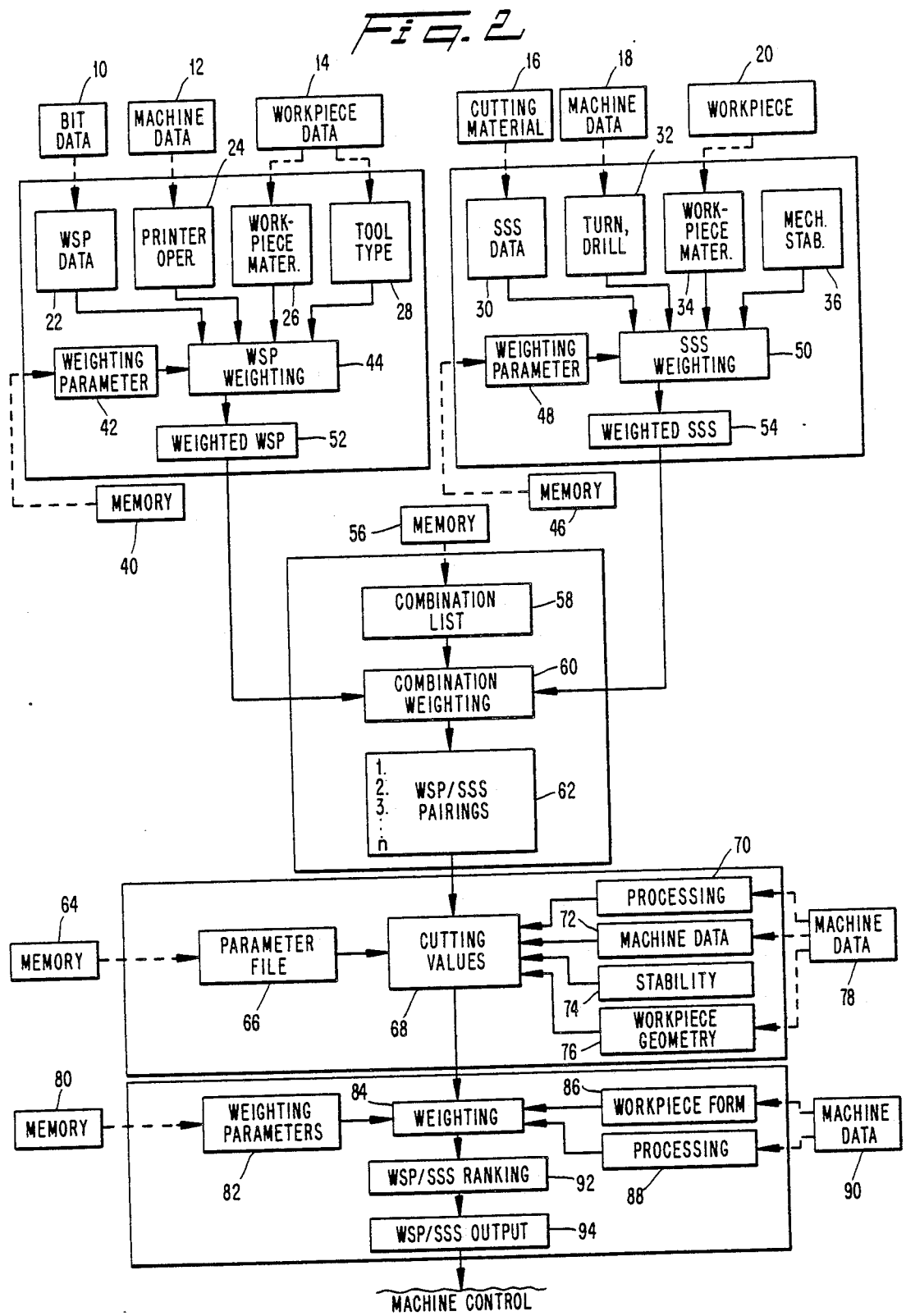

PROCESS FOR THE CONTROL OF A MACHINE TOOL

BACKGROUND OF THE INVENTION

The present invention rates to a process for the control of a machine tool by means of a data processing unit of the type wherein an operator feeds data relative to an article to be machined into the data processing unit, which in turn automatically derives control commands for the operation of the machine tool from such data.

A process of this type is generally disclosed in European Patent Application No. 44,192. In this process, the operator cooperates interactively with a data processing unit that controls the machine tool. The operator enters symbolically coded data concerning the configuration of the article to be produced. This data is evaluated by the data processing unit and processed into control commands for the operation of the machine tool.

The operation of a numerically controlled machine tool is determined by a plurality of variables. For the machine tool to operate optimally, data concerning the workpiece, the tool, the machine itself, the cutting process to be used, and general boundary conditions, such as life, wear, etc. must be taken into consideration.

The state of the art requires that all of these variables be taken into account. As a result, the operator must process considerable knowledge of these conditions and must be able to program the data processing unit which is to control the machine tool. The operator must therefore have extensive knowledge of the interrelationships of the individual variables and in addition must be familiar with a programming language. The programming procedure is extremely complex. Known data processing units for the determination of optimum operating data for the operation of a machine tool are not machine specific. If sets of data are to be obtained for the control of a certain given machine tool, the data of the machine specifically involved must be taken into consideration and entered during programming of the data processing unit, which substantially increases the labor required.

Furthermore, the variables for optimum machine performance depend extensively on each other, i.e., for an optimum operation of a machine tool the individual values must be correlated with each other. The changing of one variable may result in changes in one or several other variables.

The determination of control data for the machine tool essentially involves the so-called machining data determination. This determination comprises the selection of the optimum cutting edge geometry (dimensions of the bit, radii, form, deflection shoulders, etc.) and the choice of the correct bit type (i.e., the material of the cutting edge). In addition, the optimum cutting velocities and limiting rpm, including the drive gear of the required machine tool, must be determined. Furthermore, the feed for the tool slide, the cutting depth, the number of cuts, the minimum admeasure (the material to be cut in finishing or preliminary processing operations), the necessary working spindle capacity and the cutting edge contact time must be calculated.

It is an object of the present invention to provide a novel process for the control of a machine tool by means of a data processing unit, in which an operator is able to carry out an optimum metal cutting process without knowledge of a programming language and without specific familiarity with the individual mutual dependencies of the variables.

BRIEF STATEMENT OF THE INVENTION

In accordance with the present invention, this object is achieved by storing data bases for various machine tools and machining operations in the data processing unit. The data base for each machine tool contains data relative to the given machine tool, such as rpm range, fields of drive, the drive characteristic (force, capacity, torque), drive gear steps, axle feed forces and the corresponding velocities, maximum cutting force, workpiece clamping force, speed limits, chuck conditions, coefficients of friction, tailstock, steadyrest and the static and dynamic stabilities. Also stored is data concerning possible workpieces, such as materials, treatment condition, alloying components, mechanical strength properties, surface conditions, cutting behavior, machinability, chip form, workpiece forms, such as the dimensions of stock, workpiece stabilities, surface quality, accuracy requirements and machining conditions (e.g., continuous/interrupted machining).

Additional information stored in the data base includes data concerning the tools insertable into a given machine tool, such as individual types of tools, their stability and dimensions, including cutting edge geometry, loading capability, working range, grades of the bit material and their suitability for certain workpiece materials, machining conditions, stability, possible cutting speeds, chip cross sections and suitability for certain processing methods. Data concerning individual processing methods, such as turning, rough machining, finish machining, contour turning, tapping, together with drilling, milling and thread cutting is also stored in the data base, as well as data relating to general boundary conditions of the machining of workpieces, such as tool lives, wear, etc.

In addition to this reference information, the data base contains subroutines capable of determining from this information the possible corresponding machining data, including bit material grades and bit shapes that may be inserted into a given machine tool.

In operation, the operator enters data into the data processing unit the material of the workpiece, the type of tool and the surface quality desired of the article to be produced. From this data and that stored in the data base, the data processing unit determines, by means of the aforementioned subroutines, the possible machining data including a weighting factor, and displays the results. In one mode, the most favorable set of machining data is automatically selected from the machining data determined in the above manner and used to directly control the machine tool. Alternatively, in another mode the operator can select the data to be applied to the control of the machine tool from plural sets of machining data that are displayed. In another mode the operator arbitrarily enters machining data into the data processing unit, which is tested and weighted by means of the data base and the subroutines.

Whereas in the process disclosed in European Application No. 44,192 the data for the control of the machine tool is entered and determined independently for a specific machine at a centrally located controller for a plurality of machine tools, in the case of the control process according to the invention the data processing unit is integrated with a specific given machine tool. All of the data relating to the given machine tool may therefore be contained in a data base permanently stored in the data processing unit and it is not necessary for the operator to enter any data concerning the machine for the determination and computation of optimum machining data. This data is then available permanently in the data base.

Furthermore, according to the invention subroutines once developed are stored in the data base, which are available for all future machining processes. These subroutines make possible the selection, determination and computation of all of the aforementioned variables for an actual machining process. As a result, it is necessary for the operator to only enter data required for the computation, such as data relative to the material of the workpiece, the type of tool to be used and the surface quality desired of the article to be produced. The data processing unit then determines by means of the subroutines stored in the data base the suitable cutting data for carrying out the machining process, including the weighting of the individual cutting data. According to the invention, the possible grades of the cutting material (i.e., the different materials of the cutting tools available in a given machine) and the possible bit shapes (i.e., the geometry of the cutting edge of bit), are weighted independently of each other. All possible pairings of cutting materials and bit shapes are formed by combination and again weighted. Weighting is effected in keeping with the criteria of interest, taking into account, in particular, the time required, quality, deviations from optimum machining values or the exceeding of absolute boundary values, which are also stored in the data base.

The evaluation may be displayed for the operator on a screen, which together with a keyboard forms the interface with the operator, in a conventional notation, i.e., for example "very good", "good", "satisfactory" . . . "unsatisfactory", wherein optionally following the evaluation notation, the particular advantages and disadvantages relative to time and/or quality, etc., may also be listed.

According to the invention, the most favorable set of machining data can be selected from among those evaluated, and entered automatically into the controls of the machine tool. Alternatively, the operator can select from among the cutting material/cutting geometry pairings the one that appears to be the most favorable and enter it into the data processing unit. According to a further variant of the invention, the operator may arbitrarily enter cutting material/cutting geometry pairings into the data processing unit, which then are tested and evaluated by means of the data base and the stored subroutines for suitability.

All of the data forming the data base is determined previously by empirical-experimental methods.

In a preferred embodiment of the invention, all of the cutting means available in the machine tool are displayed graphically to the operator and the operator then selects the means best suited to the given machining process.

As an alternative to the above described determination of optimum cutting material/cutting geometry pairings by means of the data base in view of the data entered by the operator relative to the material of the workpiece, the type of tool and the surface quality desired, the operator may arbitrarily enter proposals concerning, for example, the cutting material grades and/or desired bit geometrics into the data processing unit, which then performs an evaluation of the bit material and geometries with consideration of the variables present in an individual case.

BRIEF DESCRIPTION OF THE DRAWINGS

The invention will become more apparent from the following description of an embodiment illustrated in the drawings, wherein:

FIG. 1 is a schematic block diagram of the hardware used in the implementation of the present invention, and FIG. 2 is a flow diagram to illustrate the process according to the invention for the determination of optimum machining data for the control of the machine tool.

DESCRIPTION OF THE ILLUSTRATED EMBODIMENT

The basic components of an automatically controlled machine tool system are shown in FIG. 1, and include the machine tool, a data processing unit (DVA), an input device, a display unit and a printer. These components are integrated within a given machine tool system. The data processing unit directly controls the machine tool, and receives information from the operator by means of the input device, from which the processing program to drive the machine tool is derived. The data processing unit cooperates interactively with the operator, i.e., the unit queries the operator by means of the display unit and issues intermediate and final results, for example, by means of a printer.

The data processing unit has a data base which contains all of the information determined empirically or by computation concerning the machining processes that may be carried out by the machine tool. This information may be roughly divided into the following variables (parameters):

First Variable: Machine Tool

The following characteristics are stored relative to the machine tool: rpm range, field of drive characteristic (force, capacity, torque), gear steps, axial feed forces and the corresponding velocities, maximum cutting force, clamping force, coefficients of friction, chuck condition, tailstock, steadyrest, together with static and dynamic stabilities.

Second Variable: Workpiece

Data concerning possible workpiece materials are stored in the database: treatment condition, hardness, alloying components, mechanical strength, surface condition, machining behavior, machinability and chip geometry.

Further data can be stored relative to possible workpiece geometries, in particular raw and finished dimensions, stability, surface quality, accuracy specifications and interruptions of cutting.

Third Variable: Tool

Information is stored in the data base concerning the tool that may be used in a given machine, relative to basic tool types, their dimensions and stabilities. This data relates primarily to the form of the cutting edge and secondarily to the grade of the bit material. With respect to the form of the cutting edge the following data is stored: fundamental geometries, bit geometries, deflection shoulders, loadabilities, working ranges, suitability for different processing modes (such as turning, milling, drilling, etc.). Regarding the grade of the bit material, data is stored in relation to suitability for different workpiece materials, cutting conditions, stabilities, working ranges or cutting rates, chip cross sections and suitability for individual processing methods.

Fourth Variable: Processing Method

Information is stored in the data base concerning the different machining processes that may be carried out on a given machine tool. The following can be included as machining processes: turning (rough machining, finishing, contour turning, tapping), drilling, milling and thread cutting.

As a fifth variable, general boundary conditions and limitations must be taken into account, in particular the life of the cutting tools, the wear of different parts and other parameters.

All of the above-mentioned variables together determine the machining process.

The different variables depend on each other in a complex manner. For the production of a certain finished part from a given blank, definite values of the individual variables must be selected and determined as a function of the specifications. A change in one variable may result in the need for changing one or several other variables, if the machining process is to satisfy certain quality requirements and the process is to be carried out in the shortest period of time possible.

With respect to the weighting criteria of time, quality, the observation of given boundary values, etc., different sets of variables must be evaluated differently, i.e., there exists a quality ranking for different sets of variables to control the machine tool. These complex interrelationships are in part known form the literature and, if not, can be determined empirically.

In the data base of the data processing unit DVA, information concerning the individual variables and their relationship are further stored in the form of subroutines, which correlate the individual values chosen with the corresponding machining data, in particular the possible cutting rates, advances and cutting depths.

More particularly, this determination of the machining data comprises the following individual steps:

(a) The most favorable workpiece material/bit material combination is determined, i.e., for the material to be cut, the most suitable bit grade (material) is established.

(b) For a given workpiece and the article to be produced from it, a selection is made of the most favorable bit geometry (bit dimensions, radii, form, deflection shoulders, etc.).

(c) The following must be determined from the data also stored in the data base relative to the machine tool: cutting velocity $v_C$, the limiting rpm n and the gear step required.

(d) On the basis of the given conditions the following must be calculated: the feed rate f for the tool slide, the cutting depth $a_p$, the number of cuts i, the minimum admeasure (the material to be removed in finishing or preprocessing operations), the work spindle capacity required $p_e$ and the cutting edge contact time $t_n$.

According to the invention, the operator is required to enter the workpiece material to be processed, the general type of tool to be used, the configuration of the finished part and the desired surface quality. From these, the data processing unit determines the possible machining values for all possible bit shape/bit material combinations, including the weighting of individual pairs on the basis of the stored data. The data processing unit can select the best bit shape/bit material pairing including the corresponding data and directly control the machine tool with it.

The process for the determination of the most favorable bit shape/bit material pairings, including the corresponding machining data, will be further described with reference to FIG. 2.

In the process represented in the flow diagram of FIG. 2, the function blocks 10, 12, 14, 22, 24, 26, 28, 40, 42, 44 and 52 describe the determination of a suitable bit configuration, designated WSP in the drawing, for an indexable cutting insert. In the data processing unit different inserts and correspondingly different bit configurations are available, which are stored in the data base. The bit data 10, the machine data 12 and the workpiece data 14 are contained in the data base according to FIG. 1. In the WSP weighting block 44, all of the data relating to the bit configuration (bit data 10) is entered, as well as a weighting parameter 42, from a separate memory 40. The individual indexable inserts WSP are evaluated and inserts suitable for the given work material and machine data are provided, including an evaluation, by a function block 52.

In manner parallel to the above, by means of the function blocks 16, 18, 20, 30, 32, 34, 36, 46, 50 and 54 a set of bit material grades SSS is determined and produced. The individual bit material grades are also evaluated. According to the process of FIG. 2, the selection and weighting of the material grades SSS is carried out with consideration of the machine data (block 18) and the material of the workpiece to be machined (workpiece material file 20). The so-called processing case, i.e., for example, whether turning, drilling or milling is involved, is also taken into account. Weighting parameters (block 48, memory 46) are also stored in the data base, wherein it is possible to determine whether a certain cutting bit material (initially independently of the bit configuration) is suitable for the machining process desired.

In a combination generator 60 the indexable cutting inserts WSP and bit material types SSS initially determined independently of each other are then combined with each other. Based on the pre-evaluation effected in the function blocks 52, 54, only certain WSP/SSS pairs, i.e., a maximum number n of pairs, wherein n is a given number, are produced. This pre-evaluation of the variables WSP and SSS considerably reduces the computing effort.

Then, in accordance with the function block 68, the corresponding machining values, i.e., the cutting velocity, feed rates and cutting depths, are determined for the best WSP/SSS pairings. For this procedure, the data and subroutines stored in the data base (memory 64 and parameter file 66) are used. The determination of the machining values for all of the n number of WSP/SSS pairs further requires data concerning the processing to be carried out (turning, milling, etc.) processing block 70, machine data block 72), values relative to stability (block 74) and the workpiece geometry (block 76). All of this data is processed in block 68, to compute the machining values for the WSP/SSS pairings.

The determination of the machining data corresponding to the individual WSP/SSS pairs is effected with consideration of the given individual values of all of the variables, as follows:

(a) the chip cross section ranges are determined,
(b) the chip cross sections are defined in view of the given cutting force, (c) the chip cross sections are limited on the basis of the geometrically given dimensions of the workpiece,
(d) the cutting velocity and the chip cross section are adapted to the maximum available capacity of the machine,
(e) the steps (a) to (d) are carried out for all possible drive gear steps of the machine tool and WSP/SSS pairs and all of the contact times are computed, and
(f) the most suitable drive gear step is selected.

The WSP/SSS pairs are entered in the weighting block 84, wherein weighting is carried out by taking into account the given workpiece configuration and the processing desired (turning, milling, drilling, etc.), with further consideration of weighting parameters also stored in the data base (memory 80, block 82). Essential weighting parameters are the contact time and the quality of the product produced by machining. For rough processing the time is the essential weighting parameter, while in finish machining the quality of the surface produced and dimensional accuracy are important. Further weighting parameters are deviations from optimum machining values and/or the exceeding or nonattainment of given limiting values.

In the function block 92, the individual WSP/SSS pairing are ranked in keeping with the result of the evaluation, i.e., the most favorable pairing is placed first, the second most favorable second, etc. The ranking result is displayed to the operator on the display device or by means of a printer. The data processing unit can select the most favorable set of machining data and control the machine tool automatically. Alternatively, the operator can choose a desired one of the displayed sets of data and instruct the data processing unit to control the machine tool in accordance with that set.

It will be appreciated by those of ordinary skill in the art that the present invention can be embodied in other specific forms without departing from the spirit or essential characteristics thereof. The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A process for controlling a machine tool by means of a data processing unit, comprising the steps of:
    (a) storing a data base for a given machine tool in the data processing unit, said data base containing:
        (i) data concerning specific characteristics of the given machine tool;
        (ii) data relating to properties of possible workpieces;
        (iii) data describing the characteristics of tools usable in the given machine, including cutting bit materials and edge cutting geometries of the tools;
        (iv) data relating to individual processing methods;
        (v) data describing general boundary conditions in the machining of a workpiece; and
        (vi) subroutines for determining possible corresponding machining data from said stored data, including bit material grade and bit configuration suitable for use in the given machine tool;
    (b) manually entering the material of the workpiece, the type of tool and the surface quality desired of the article to be produced into the data processing unit,
    (c) determining in the data processing unit, by means of said subroutines, (i) the suitability of a plurality of cutting bit materials for the workpiece material, (ii) the suitability of a plurality of edge cutting geometries for the article to be produced, and (iii) the suitability of a plurality of sets of machining data each of which includes a combination of a bit material and a cutting edge geometry whose suitability is determined in steps (i) and (ii);
    (d) displaying said plurality of sets of machining data; and
    (e) controlling the machine tool in accordance with one of the sets of displayed data.

2. The process of claim 1 wherein the sets of machining data are displayed with individual rankings as to their suitability for a given machining operation and the machine tool is automatically controlled in accordance with the most favorably ranked set of data.

3. The process of claim 1 further including the step of manually selecting the set of machining data that is to be used to control the machine tool.

4. The process of claim 1 wherein step (b) includes manually entering arbitrary machining data into the data processing unit and said step (c) includes the steps of determining the suitability of the manually entered machining data for a given machining operation.

5. The process according to claim 1, wherein the data processing unit determines, displays and ranks at least the following machining data for a plurality of bit material grades and cutting edge geometries:
    the possible cutting velocities,
    the possible feed rates, and
    the possible cutting depths.

6. The process according to claim 5, wherein said subroutines select the cutting velocity and chip cross section according to the maximum available capacity of the machine tool.

7. The process according to claim 6, wherein said subroutines determine necessary contact times for all possible drive gear steps of the machine tool and all possible bit geometry/bit material combinations, and select the most favorable contact time.

8. The process according to claim 1 wherein arbitrary proposals concerning the bit material grade and desired bit geometry are manually entered into the data processing unit during step b) and a set of machining data is determined from this information.

9. The process of claim 1 wherein the data (a)(i) concerning characteristics of a given machine tool that is stored in the data base includes rpm range, drive characteristic force, capacity, torque, drive gear steps, maximum cutting force, workpiece clamping force, rpm limits, chuck condition, coefficients of friction, tailstock, steadyrest and static and dynamic stabilities.

10. The process of claim 1 wherein the data (a)(ii) relating to properties of possible workpieces that is stored in the data base includes workpiece materials, treatment conditions, alloying components, mechanical strength properties, surface conditions, machining behavior, machinability, chip shapes, workpiece configurations such as blank dimensions, workpiece stabilities, surface qualities, accuracy specifications and cutting conditions.

11. The process of claim 1 wherein the data (a)(iii) describing the characteristics of tools that is stored in the data base includes individual types of tools, their stability and dimensions, loadability, working range, cutting conditions, stability, possible cutting velocities, chip cross sections and suitability for certain processing methods.

12. The process of claim 1 wherein the data (a)(iv) that is stored in the data base relates to the processes of turning, rough machining, finishing, contour turning, tapping, drilling, milling and thread cutting.

13. A process for controlling a machine tool by means of a data processing unit, comprising the steps of:
   (a) storing a data base for a given machine tool in the data processing unit, said data base containing:
      (i) data concerning characteristics of the given machine tool;
      (ii) data relating to properties of possible workpieces;
      (iii) data describing the characteristics of tools usable in the given machine;
      (iv) data relating to individual processing methods;
      (v) data describing general boundary conditions in the machining of the workpiece; and
      (vi) subroutines for determining possible corresponding machining data from said stored data, including bit material grade and bit configuration suitable for use in the given machine tool;
   (b) manually entering the material of the workpiece, the type of tool and the surface quality desired of the article to be produced into the data processing unit,
   (c) determining in the data processing unit a plurality of sets of possible machining data by means of said subroutines and displaying said plurality of sets of machining data with individual rankings as to their suitability for a given machining operation; and
   (d) controlling the machine tool in accordance with one of the sets of displayed data.

14. The process of claim 13 wherein the data (i) concerning characteristics of a given machine tool that is stored in the data base includes rpm range, drive characteristic force, capacity, torque, drive gear steps, maximum cutting force, workpiece clamping force, rpm limits, chuck condition, coefficients of friction, tailstock, steadyrest and static and dynamic stabilities.

15. The process of claim 13 wherein the data (ii) relating to properties of possible workpieces that is stored in the data base includes workpiece materials, treatment conditions, alloying components, mechanical strength properties, surface conditions, machining behavior, machinability, chip shapes, workpiece configurations such as blank dimensions, workpiece stabilities, surface qualities, accuracy specifications and cutting conditions.

16. The process of claim 13 wherein the data (iii) describing the characteristics of tools that is stored in the data base includes individual types of tools, their stability and dimensions, inclusive of their cutting edge geometry, loadability, working range, grades of bit materials and their suitability for certain workpiece materials, cutting conditions, stability, possible cutting velocities, chip cross sections and suitability for certain processing methods.

* * * * *